(12) United States Patent
Liebl

(10) Patent No.: US 10,363,728 B2
(45) Date of Patent: Jul. 30, 2019

(54) METHOD FOR THE PRODUCTION OF LABELS, AND MULTI-LAYER COMPOSITE

(71) Applicant: Schreiner Group GmbH & Co. KG, Oberschleissheim (DE)

(72) Inventor: Christian Liebl, New York, NY (US)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 97 days.

(21) Appl. No.: 15/641,795

(22) Filed: Jul. 5, 2017

(65) Prior Publication Data

US 2018/0009210 A1   Jan. 11, 2018

Related U.S. Application Data

(60) Provisional application No. 62/358,676, filed on Jul. 6, 2016.

(51) Int. Cl.
| | |
|---|---|
| B32B 38/00 | (2006.01) |
| B32B 3/30 | (2006.01) |
| B32B 7/12 | (2006.01) |
| B31D 1/02 | (2006.01) |
| B32B 37/12 | (2006.01) |
| B32B 37/00 | (2006.01) |

(52) U.S. Cl.
CPC ............ *B32B 38/145* (2013.01); *B31D 1/021* (2013.01); *B31D 1/026* (2013.01); *B31D 1/027* (2013.01); *B32B 3/30* (2013.01); *B32B 7/12* (2013.01); *B32B 37/0076* (2013.01); *B32B 37/12* (2013.01); *B32B 2519/00* (2013.01)

(58) Field of Classification Search
CPC .................................................... B32B 38/145
USPC ............................................................ 428/98
See application file for complete search history.

(56) References Cited

U.S. PATENT DOCUMENTS

| | | | |
|---|---|---|---|
| 4,194,039 A | 3/1980 | Mueller | |
| 6,082,777 A | 7/2000 | Grosskopf et al. | |
| 6,541,090 B2 | 4/2003 | Grosskopf et al. | |
| 8,431,205 B2 | 4/2013 | Seidl | |
| 2001/0052386 A1 | 12/2001 | Treleaven et al. | |
| 2011/0223368 A1 | 9/2011 | Zietlow et al. | |

(Continued)

FOREIGN PATENT DOCUMENTS

| | | |
|---|---|---|
| DE | 29 14 911 A1 | 10/1979 |
| DE | 601 16 097 T2 | 9/2006 |
| EP | 2 290 638 | 3/2011 |

(Continued)

*Primary Examiner* — Brent T O'Hern
(74) *Attorney, Agent, or Firm* — Collard & Roe, P.C.

(57) ABSTRACT

A method produces labels having multiple sheets glued together in a first surface region of the basic label and lying loosely on top of each other in a second surface region. After printing an anti-adhesion layer in first surface regions and a frame region, webs are applied and printed to produce lowermost label sheets. An anti-adhesion layer is printed onto the last web in third surface regions lying between the first and/or second surface regions and the frame region. After punching the material web between the third surface regions and the first and/or second surface regions, an outermost web is applied and printed. By punching a frame through all webs, a lattice take-off is severed, simultaneously forming an outermost sheet section in each third surface region projecting laterally beyond the lowermost label sheets.

13 Claims, 15 Drawing Sheets

(56) References Cited

U.S. PATENT DOCUMENTS

2016/0180747 A1* 6/2016 Pietarinen ............ G09F 3/0292
206/438

FOREIGN PATENT DOCUMENTS

| WO | 98/07133 A1 | 2/1998 |
|----|----|----|
| WO | 2011/112215 A1 | 9/2011 |

* cited by examiner

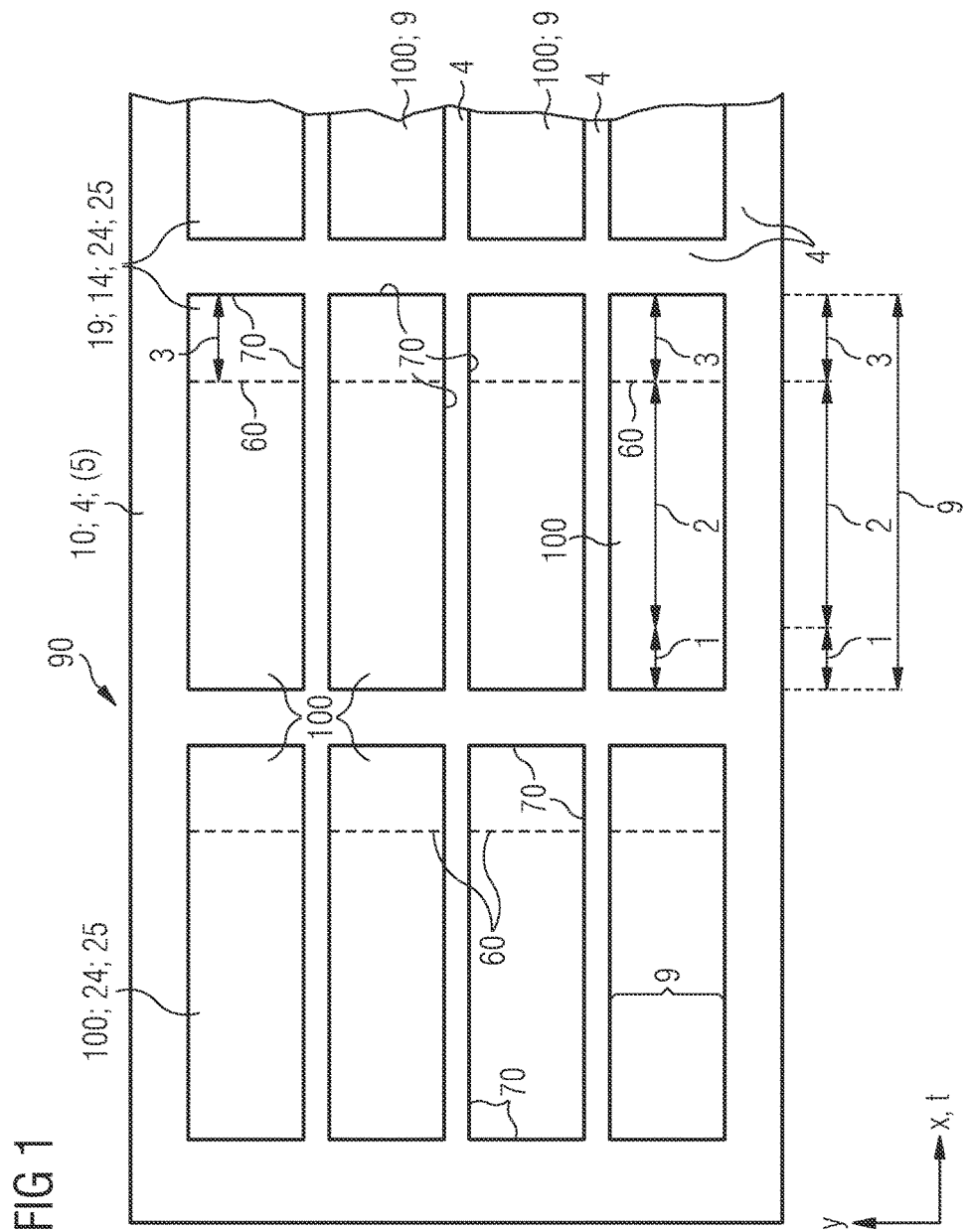

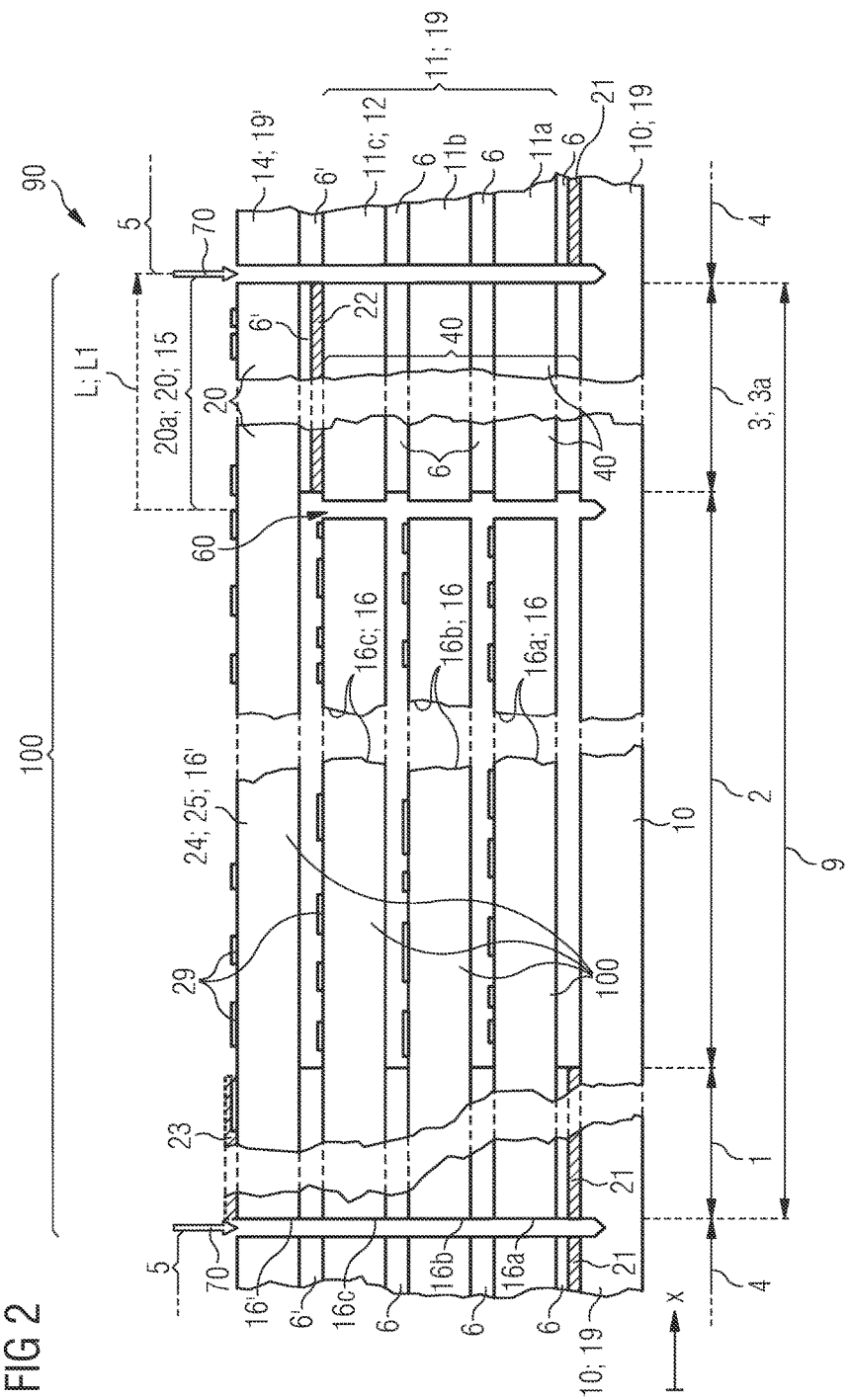

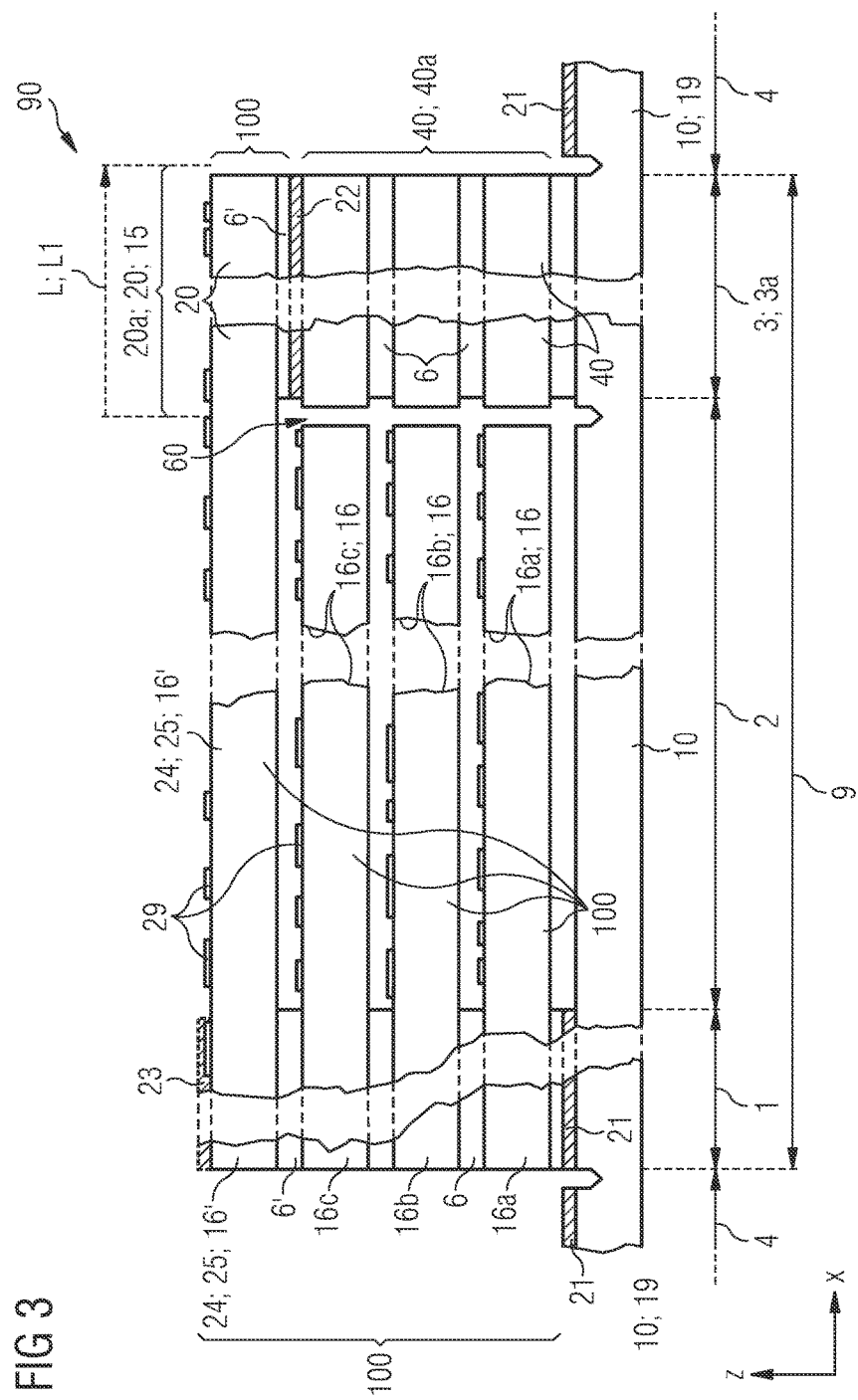

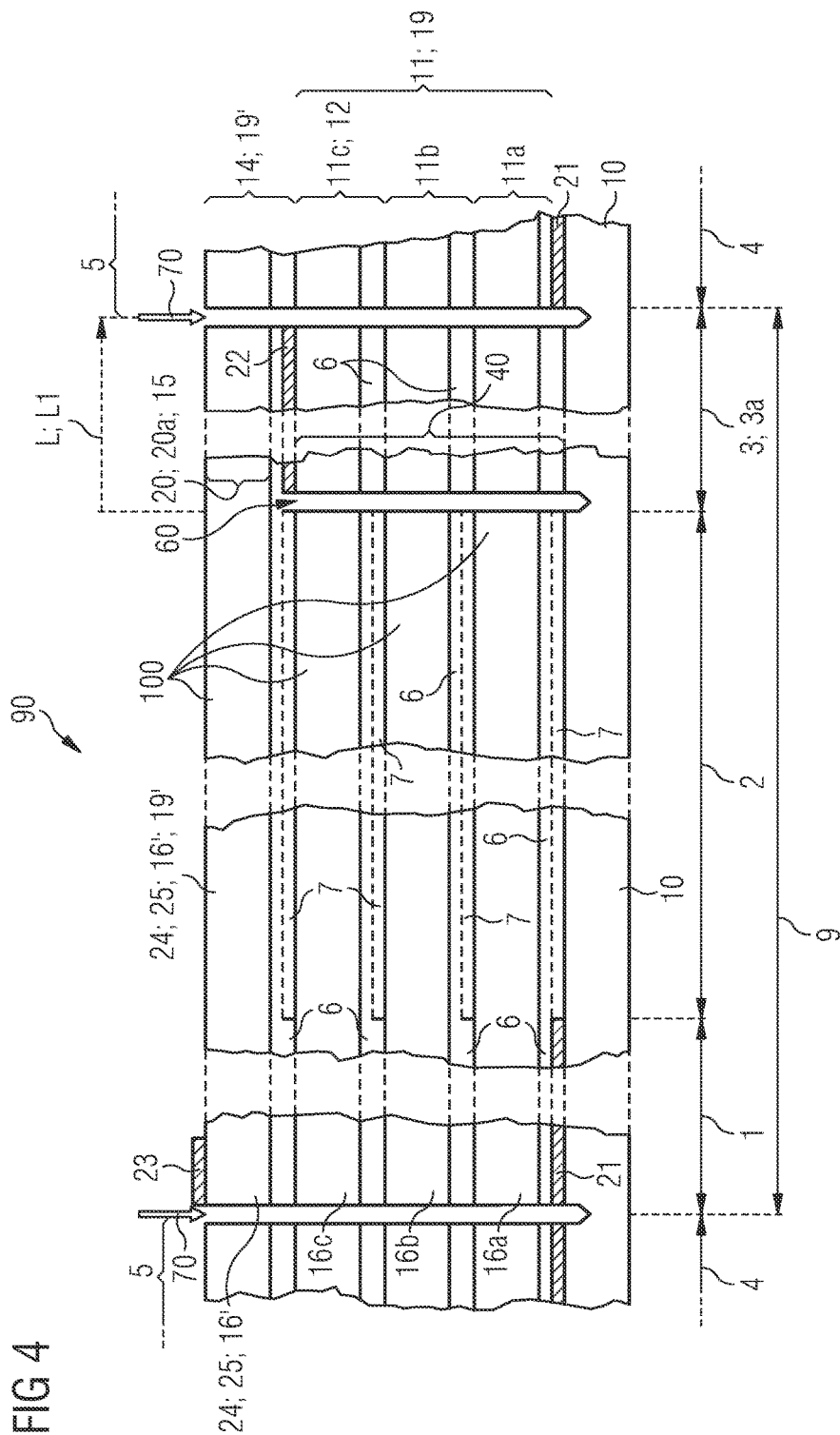

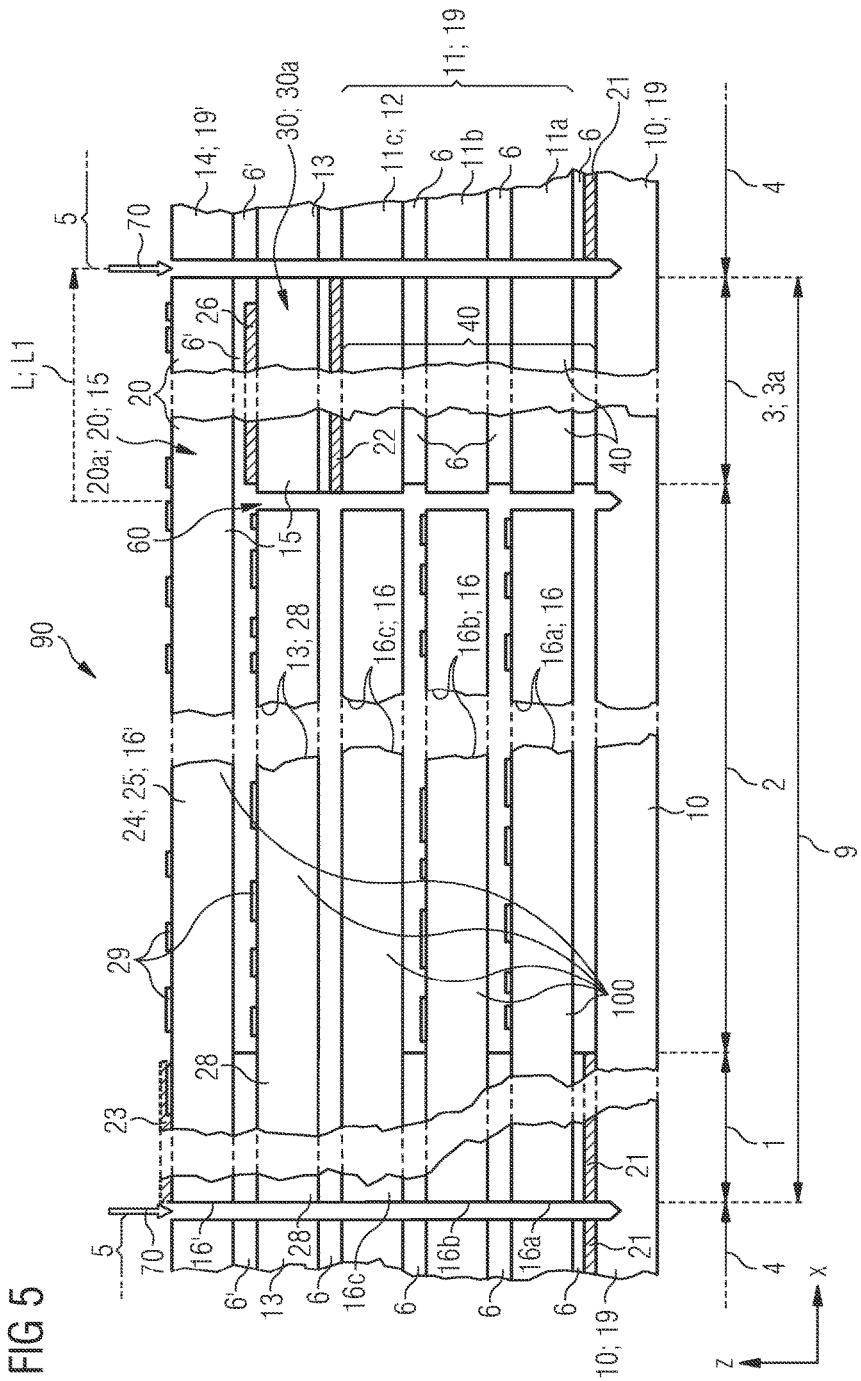

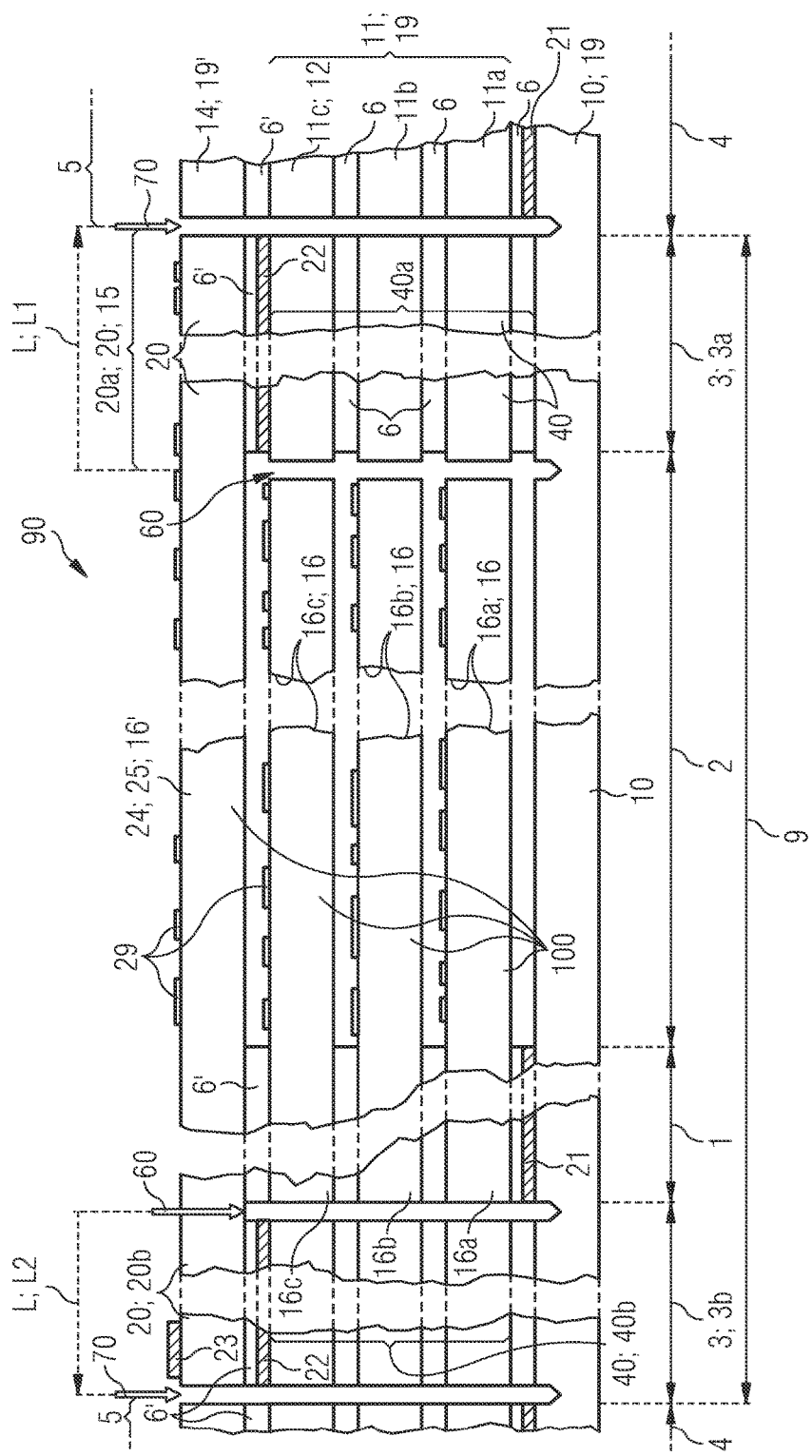

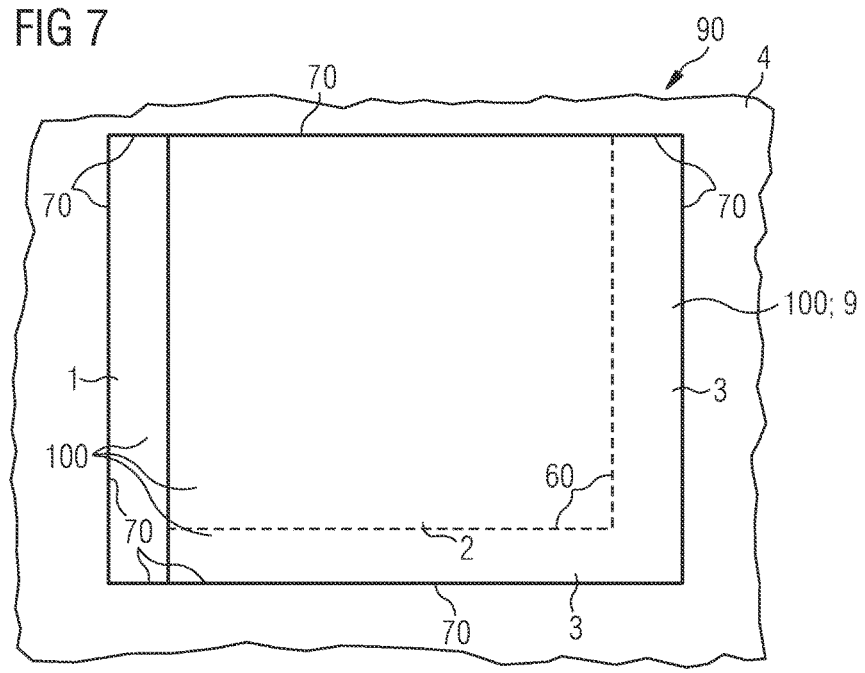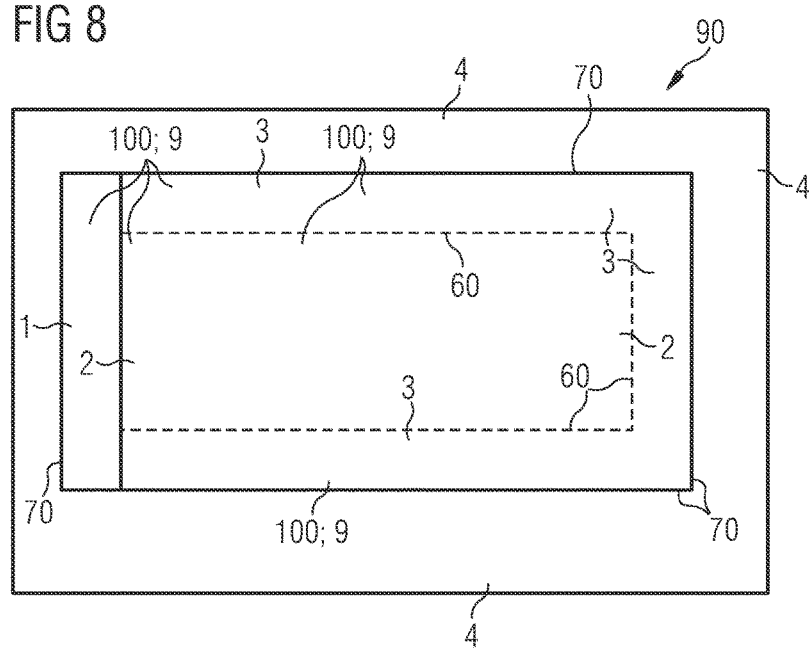

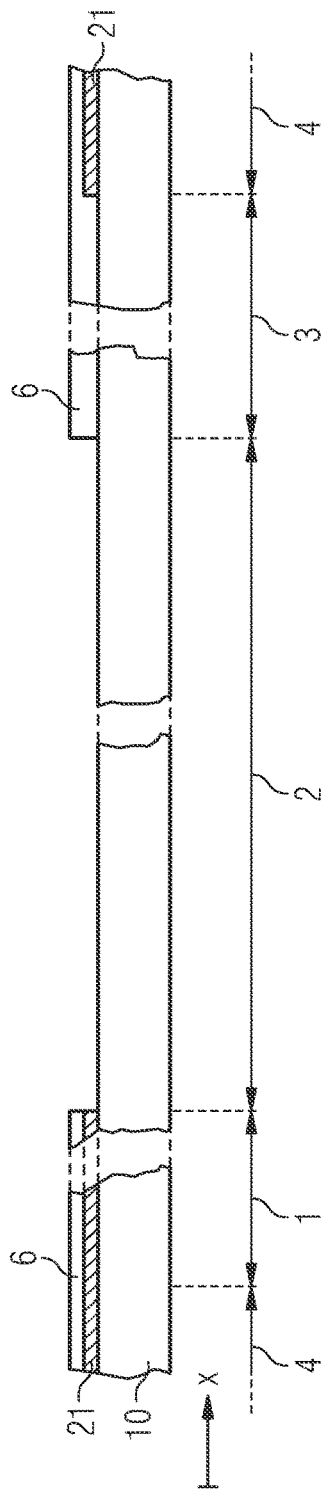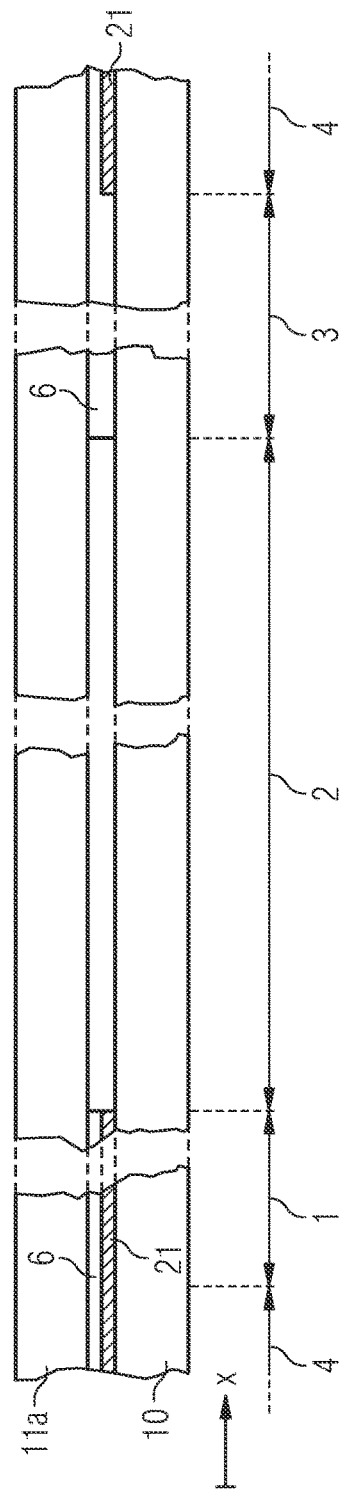

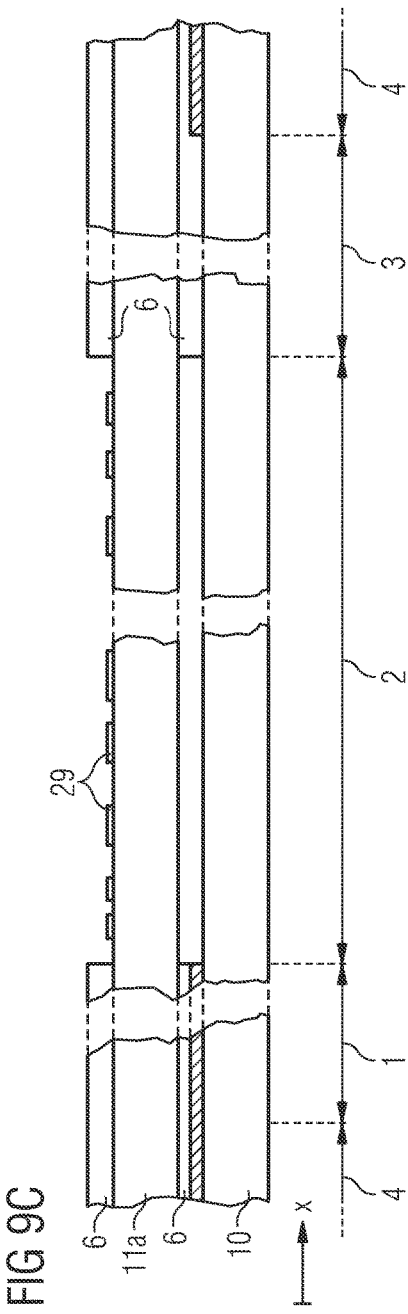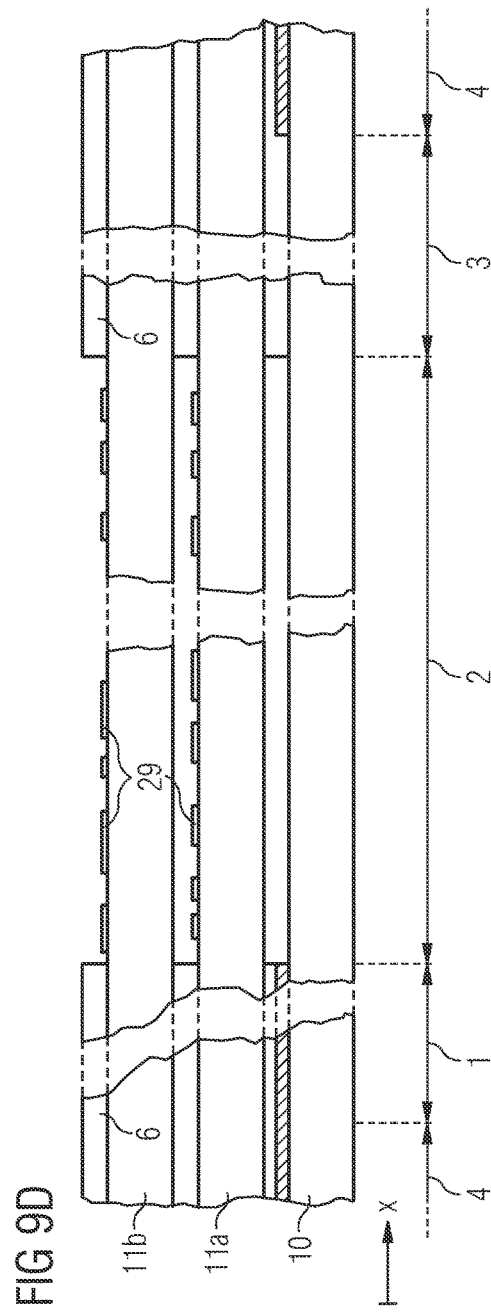

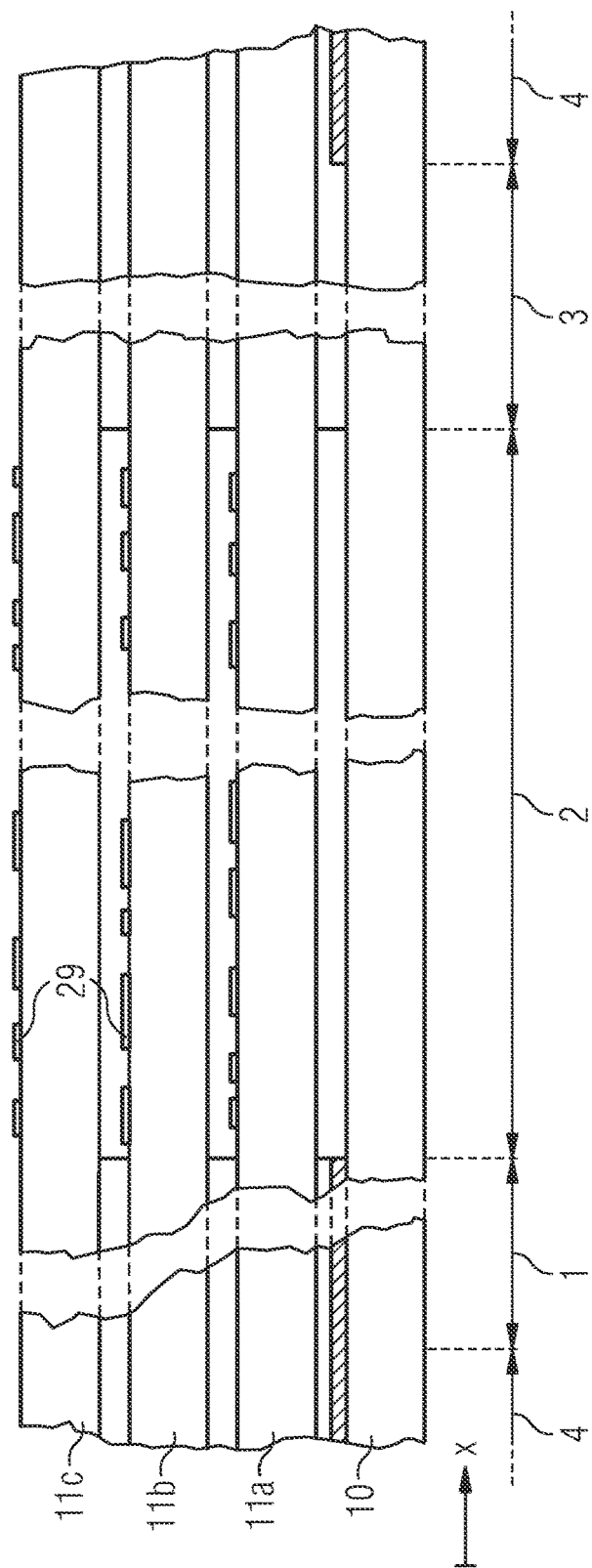

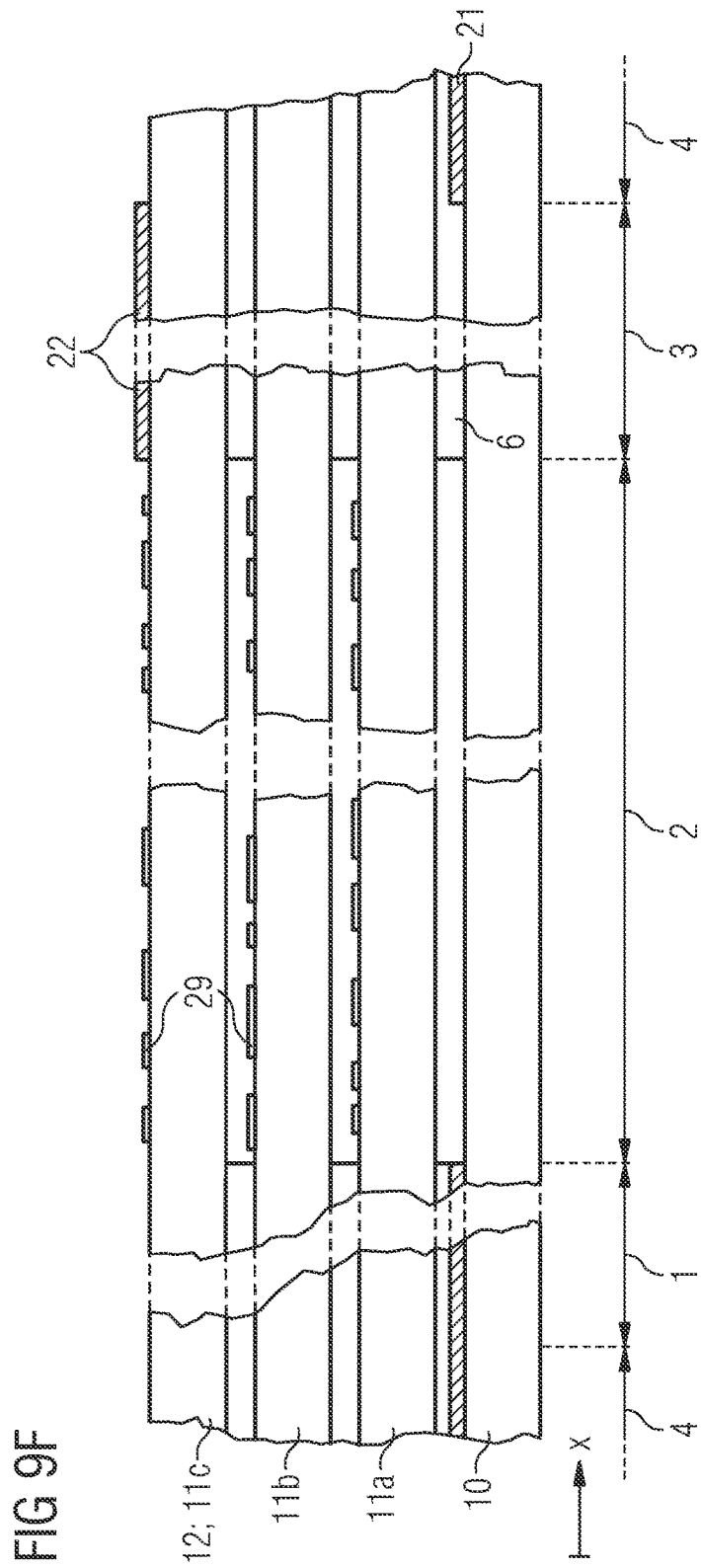

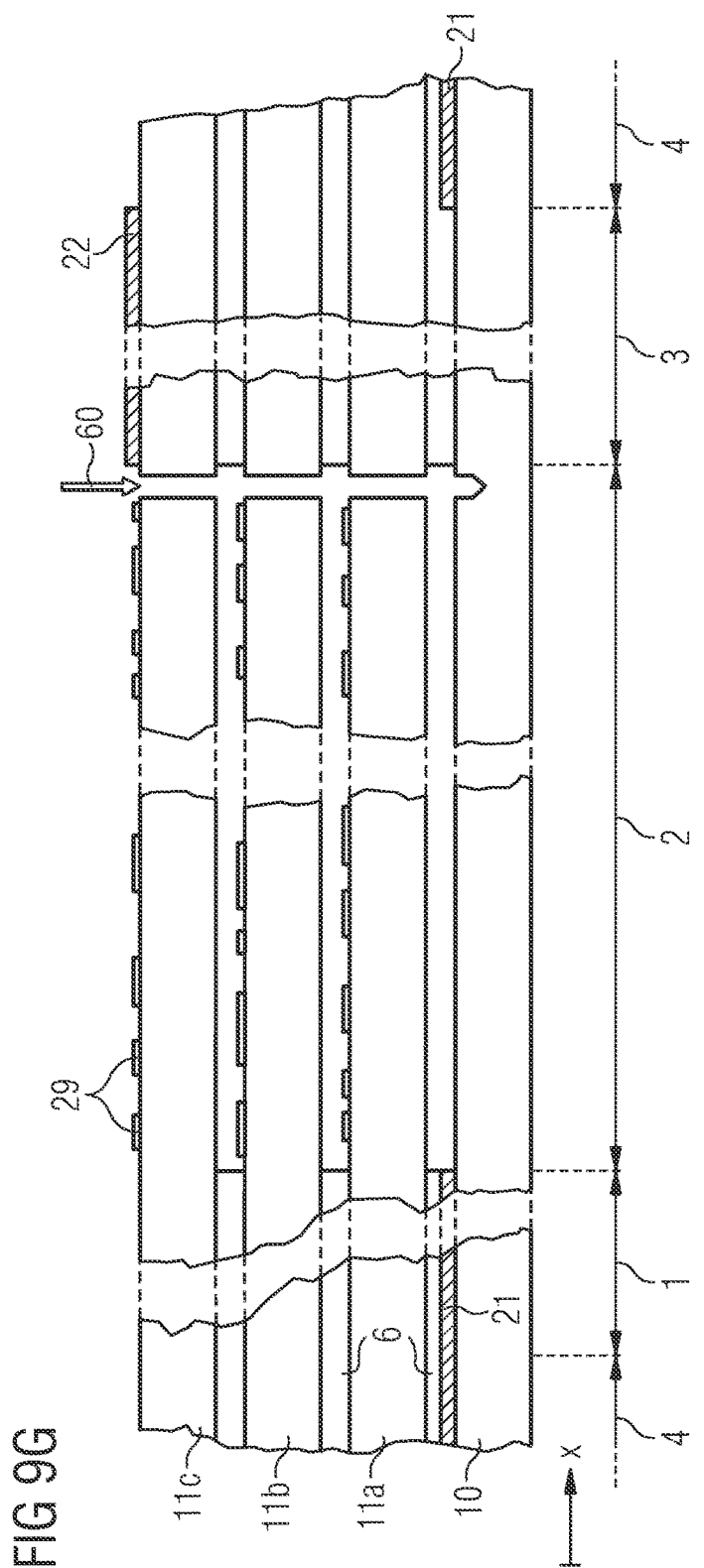

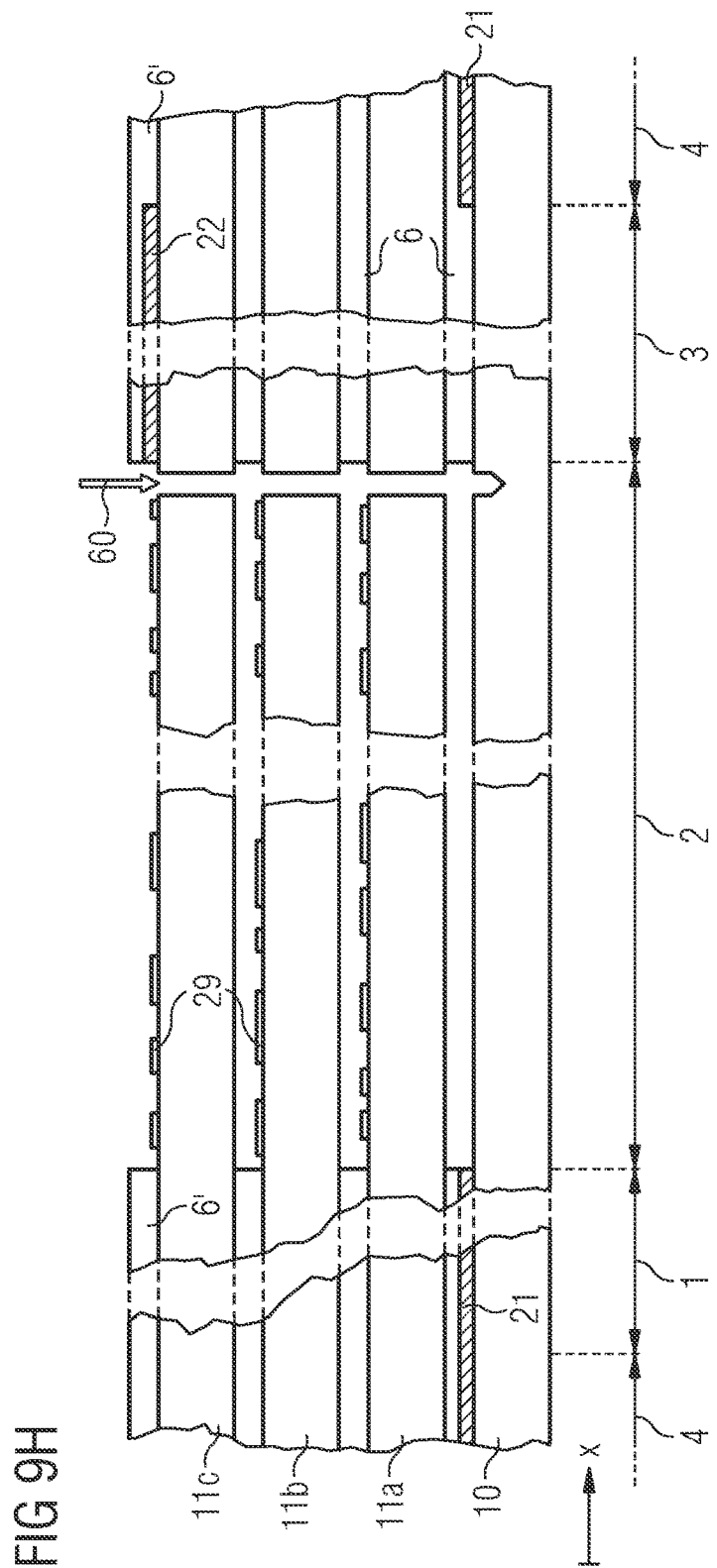

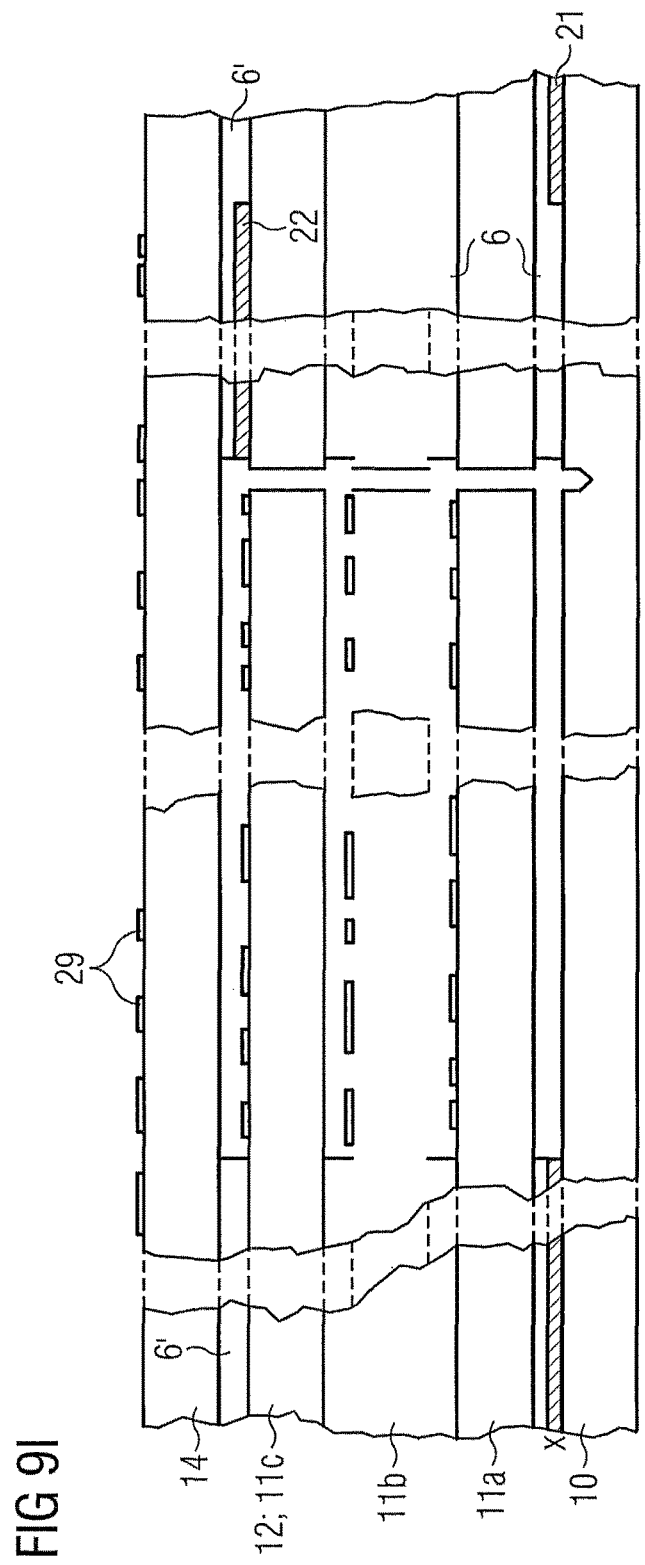

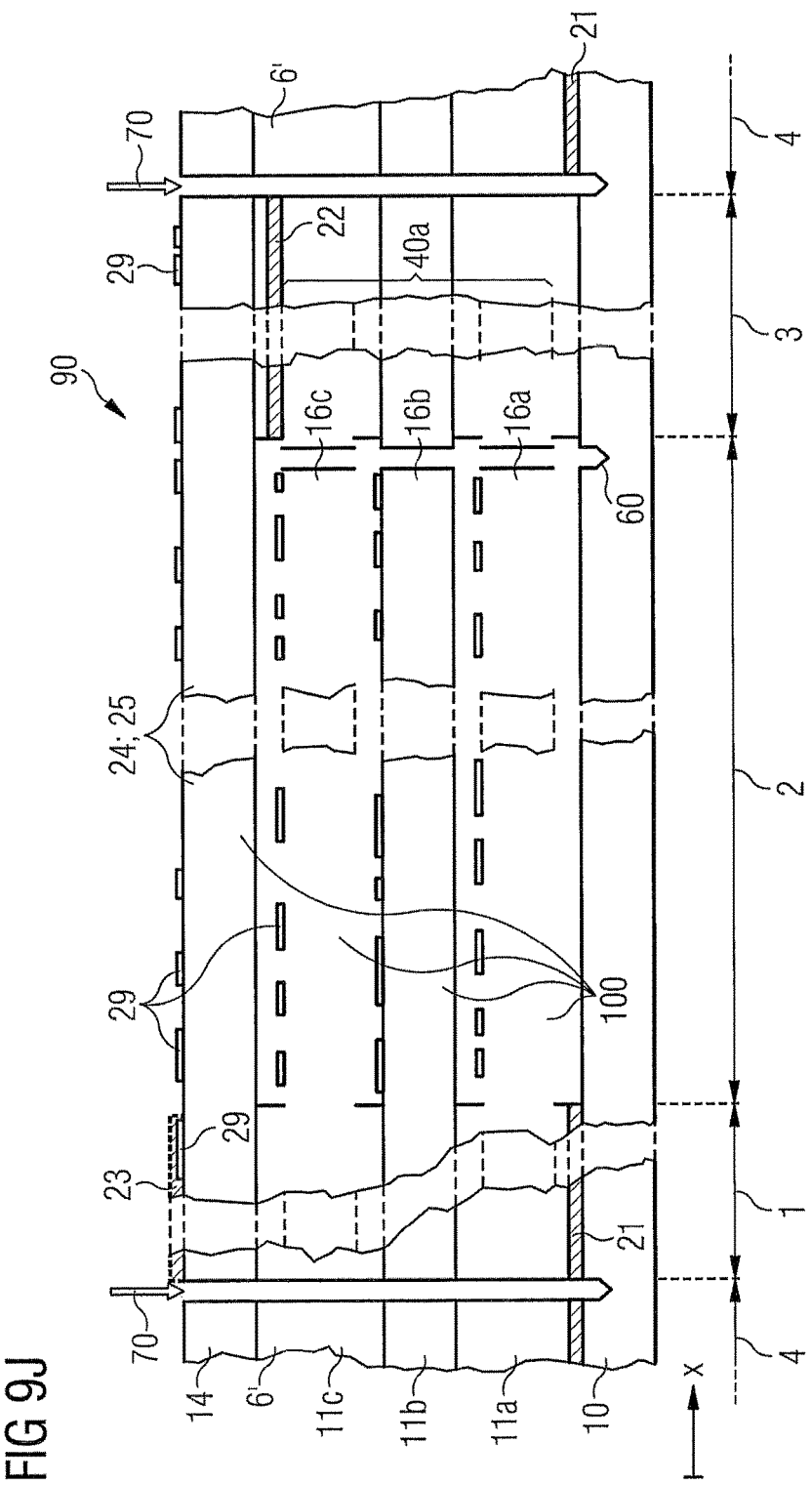

METHOD FOR THE PRODUCTION OF LABELS, AND MULTI-LAYER COMPOSITE

CROSS REFERENCE TO RELATED APPLICATIONS

Applicant claims priority under 35 U.S.C. § 119(e) of U.S. Provisional Patent Application. Ser. No. 62/358,676 filed on Jul. 6, 2016, the disclosure of which is incorporated by reference.

BACKGROUND OF THE INVENTION

Field of the Invention

This application relates to a method for the production of labels, which have a plurality of sheets, in each instance. The application furthermore relates to a multi-layer composite having at least one label that has a plurality of sheets.

Description of the Related Art

Labels having multiple sheets, which are referred to, in part, as booklet labels, are structured similar to a booklet, wherein the lowermost or innermost sheet of the label is intended to be adhesively attached to an object, and the sheets that lie above it can be flipped open. Such labels having multiple sheets are required if the available surface area of the object to be labeled is not sufficient to accommodate the required information to be accommodated, particularly the written information for the user of the object, on a single sheet. Particularly in pharmacy or medicine, but also in many other technical fields, objects are in use that regularly require the use of such multi-sheet labels. In pharmacy, these are, for example, ampoules, vials, syringes or other containers for storing and/or administering medications, particularly liquids. The area of use of the method described below is not, however, restricted to a specific technical area of use of the labels to be produced.

In the case of labels that have a plurality of sheets, the uppermost sheet is often configured to be larger, i.e. longer in a specific direction than the sheets of the label that are situated below it. This excess length serves to close off the label, which has sheets that are to be opened, during dispensing, so that the upper sheets of the label do not project away from the lowermost sheet of the label; on rounded or curved surfaces of the object to be labeled, in particular, for example of a cylindrical circumference surface of a container or other object. Such labels can be conventionally produced in that first, the individual sheets of the label are printed and punched in accordance with the desired format, in each instance, and subsequently placed one on top of the other with precise fit, and adhesively attached to one another.

The production of such multi-sheet labels with an excess length of the uppermost sheet or cover sheet is conventionally labor-intensive, since punching and printing the individual label sheets—some of them furthermore having different formats—requires many handling steps before the complete multi-layer composite or sheet composite of the label has been produced.

SUMMARY OF THE INVENTION

It is the task of the present invention to make available a more efficient and/or more cost-advantageous method for the production of labels that have a plurality of sheets, in each instance. It is particularly the task of the application to indicate a production method with which multi-sheet labels can be produced more efficiently, particularly with fewer work steps and/or handling steps, regardless of the excess length of their uppermost sheet. It is furthermore a task to make available a cost-advantageous and easy to produce multi-layer composite having at least one label that has a plurality of sheets.

This task is accomplished by means of the method according to one aspect of the invention and by means of the multi-layer composite according to another aspect of the invention.

BRIEF DESCRIPTION OF THE DRAWINGS

Some exemplary embodiments will be described below, making. reference to the figures. These show:

FIG. 1 a schematic top view of a multi-layer composite with a plurality of labels on a carrier web, FIG. 2 a schematic cross-sectional view through the multi-layer composite from FIG. 1 along a longitudinal direction through a label, FIG. 3 the multi-layer composite from FIG. 2 after removal of the waste matrix, FIG. 4 a cross-sectional view of an alternative embodiment of the multi-layer composite, produced from material webs to which adhesive has been applied on one side, FIG. 5 a cross-sectional view of a further alternative embodiment of the multi-layer composite with a further, second from the outside material web, FIG. 6 a cross-sectional view of a further alternative embodiment of the multi-layer composite with a further section of the outermost material web, projecting to the side, FIGS. 7 and 8, two alternative embodiments of a multi-layer composite with a different structure with regard to its surface area division, and FIGS. 9A to 9J, an exemplary sequence of method steps for the production of the multi-layer composite from FIG. 2.

DETAILED DESCRIPTION OF THE PREFERRED EMBODIMENTS

FIG. 1 shows a schematic top view from above of a multi-layer composite 90, which has a number of labels 100 (multi-sheet label or multilayer composite label) on a carrier web 10 that lies lowermost (liner; disposable carrier film). The multi-layer composite can be fabricated as sheet goods or rolled goods, for example; in the latter case, in particular, a first lateral direction x (longitudinal direction) simultaneously corresponds to the transport direction t, along which the roll is wound up or unwound, for example during fabrication or subsequent dispensing of labels. The placement and dimensioning of the labels 100 within the multi-layer composite 90 is merely given as an example and is neither to scale nor binding with regard to the number and placement as well the dimensioning of the labels; it is sufficient if at least one label 100, alternatively a plurality of labels 100 is contained in a roll or in a sheet of the multi-layer composite 90.

The basic surface area of the multi-layer composite 90 or at least its carrier web 10 is divided into the basic surface areas 9 of the individual labels 100 as well as the frame region 4 that surrounds the labels, in which the waste matrix 5 is optionally still present or has already been pulled off. In the latter case, the carrier web 10 that lies bottommost outside of and between the basic label surface areas 9 (in the representation according to FIG. 1) is visible, i.e. exposed. In particular, it can be provided with an anti-adhesion layer 21 outside of the basic label surface areas 9, which layer itself is exposed when the waste matrix has been pulled off, and covers the carrier film 10 from above. The label underside (cannot be seen in FIG. 1) is adhesively attached to partial regions of the anti-adhesion layer 21, which are disposed within the basic label surface areas 9. The carrier web 10 can be, for example, a film, particularly a plastic film, or, alternatively, a paper web, for example. The labels 100 consist of a plurality of material webs, to state it more precisely, of pieces of respective material webs, which are disposed in multiple plies one on top of the other. Each ply or material web therefore serves to form a sheet of the labels, so that labels having multiple inscribed plies are present. The outer edges of the label sheets or, in any case, those of them that are uppermost are predetermined by punch holes 70 or punch lines, which simultaneously represent the boundary to the surrounding waste matrix 5. As has been mentioned, the waste matrix can optionally still be present in the case of the multi-layer composite 90 from FIG. 1, or can already have been removed, i.e. pulled off the carrier film 10. In the region of the basic label surface areas 9, the respective uppermost ply, i.e. the uppermost or outermost sheet 24 is formed from the uppermost material web 14; in this application, it is also referred to as the cover sheet 25 of the label 100. Just like the sheets of the label that lie underneath it, it can be a film, particularly a plastic film 19, or, alternatively, can consist of paper or some other material. If the waste matrix has already been removed, separate cover sheets 24 and 25 of the labels remain, which are derived from an uppermost, originally uninterrupted material web 14.

Further sheets of the labels 100, which lie further down, are situated between the uppermost or outermost sheet 24 of the respective label 100 and the carrier web 10; they are derived from material webs that lie further down and were applied to the carrier web 10 or to the stack of material webs that was already produced, earlier than the outermost sheet 24.

The basic surface areas 9 of the labels comprise, in each instance, a first surface area region 1, in which the material webs or the sheets of the labels formed from them are adhesively connected with one another, as well as a second surface area region 2, in which the sheets of the respective label lie loosely one on top of the other. FIG. 1 schematically shows a punch line 60, which stems from a partial pre-punching process. The punch line 60 is shown with a broken line, since it runs only below the cover sheet 25 of the respective label; nevertheless, the respective punch line 60 is continuous, i.e. uninterrupted. Therefore, it separates the second surface area region 2 from a third surface area region 3 (in this embodiment), in which at least the lower sheets or material web pieces, which lie farther down, no longer belong to the label but rather serve as a substratum for a section of the cover sheet 25, which substratum projects laterally beyond the basic surface areas of the material webs or sheets that lie farther down. The multi-layer composite 90 therefore comprises one or more labels 100 with a projecting section of an outermost sheet 24; 25, wherein the projecting section is disposed at the same height above the carrier web 10 as the remaining region of the outermost sheet 24; 25, which covers the further sheets of the label in the first and second surface area region 1, 2. The labels produced according to this application, as well as the multi-layer composite 90 formed from them and the carrier film, among other things, are the result of the proposed production method, which will still be discussed in greater detail below. The labels produced in this manner can have two, three, four, five or six films or sheets, for example, particularly composed of plastic, of paper or of another material. As can be seen in FIG. 1, many labels can be disposed one behind the other on the carrier web 10 (along the first lateral direction x, which simultaneously corresponds to the transport direction t in the case of rolled goods). Furthermore, the labels can be lined up along a second lateral direction y, i.e. disposed in several webs next to one another.

FIG. 2 shows a first embodiment in a cross-sectional view, wherein the section plane runs along the direction x from FIG. 1 as well as the normal direction z, perpendicular to it, i.e. perpendicular to the drawing plane of FIG. 1. The multi-layer composite 90 is shown in the region of one of the labels 100, wherein the waste matrix 5, as it occurs within the scope of production, is also shown. The multi-layer composite 90 comprises a plurality of material webs, for example films, and, in particular, plastic films, of which the bottom one is referred to as the carrier web 10. The carrier web 10 does not belong to the actual labels 100, but rather forms their substratum and is maintained cohesively or uninterrupted even after the waste matrix 5 is pulled off; in other words, preferably only the material webs 11 disposed above it, from which the sheets of the labels 100 are formed, are interrupted by punch holes or punch lines 60, 70 and thereby separated from the waste matrix 5.

In detail, the material webs for the label comprise a number of lowermost material webs 11, which are intended for lowermost label sheets having a smaller basic surface area, of which three pieces 11a, 11b, 11c are shown as examples. However, a different number of them can be provided, for example only a single one such material web 11 or a plurality of two, four or five such material webs 11, for example. The lowermost sheets 16 of the label 100 formed from this number of material webs 11 that lie farther down extend over a first 1 and a second surface area region 2. In the first surface area region 1, the sheets 11; 11a, 11b, 11c, 14 are adhesively connected to one another, as can be seen on the basis of the corresponding regions of the adhesive layers 6. In this way, the bond that holds the sheets 11 of the label together is formed. It is situated, for example, at one edge of the label, and runs, if the material webs are present and/or processed as rolled goods, transverse to the transport direction t. The lowermost film or material web of the number of material webs 11 is not applied directly to the carrier web 10 with its underside adhesive layer 6, but rather to an anti-adhesion layer 21 disposed on it, thereby making it possible to pull the label 100 as a whole off the carrier web 10. The waste matrix 5, the sheets or material webs 11; 14 of which are adhesively connected with one another by means of the adhesive layers 6, also does not lie directly on the carrier web 10 with its underside adhesive layer, but rather on the anti-adhesion layer 21 that is situated on it. Whenever anti-adhesion layers are mentioned in this application, these can be configured, for example, as silicone layers or in another manner. In the second surface area region 2, the material web 11a of the labels lies only loosely on the carrier web 10 (partial adhesive connection of the label sheets exclusively in the first surface area region 1); here, no anti-adhesion layer is necessary.

The waste matrix 5 (preferably still during fabrication) and the labels 100 (during dispensing) can therefore be pulled off the carrier web 10. In contrast, a surface area piece disposed in a third surface area region 3, having the number of material webs 11; 11a, 11b, 11c, which piece is also produced within the scope of the production method, but belongs neither to the actual label 100 nor to the waste matrix 5, cannot be pulled off the carrier web 10. It is firmly and permanently connected with the carrier web or carrier film 10 by means of its underside adhesive layer 6; in the third surface area region 3, the anti-adhesion layer 21 is left out on the carrier web (just like, preferably, also in the second surface area region 2, where the lowermost material web 11; 11a of the respective label is non-adhesive). If the number of material webs 11 comprises a plurality of material webs, these material webs 11a, 11b, 11c are also firmly, i.e. non-releasably connected with one another by means of further adhesive layers 6.

In FIG. 2, punch lines or punch holes 60, 70 are shown, which extend through the material webs 11; 11a, 11b, 11c, 14 or some of them, and thereby represent side edges of the label 100 or its boundary with the surrounding waste matrix 5. While the punch line 70 or plurality of punch lines 70 extends through all the material webs 11, 14 above the carrier web 10 (i.e. above the lowermost material web, which serves only as a substratum), the punch line 60 does extend through the number of material webs 11; 11a, 11b, 11c, but not through the uppermost or outermost material web 14, which forms the outermost sheet 24 or cover sheet 25 of the labels. The cover sheet 25 therefore possesses a projecting section 20, which projects laterally, namely here in the direction x, beyond the number of films 11; 11a, 11b, 11c that lie lower. Because of the section 20, the outermost sheet 24; 25 possesses an excess length L or L1, which results from the lateral offset of the punch lines or punch holes 60 and 70.

The multi-layer composite produced according to the method described is structured in such a manner that labels 100 formed from multiple sheets, the sheets of which run not with complete coverage, and of which at least the cover sheet 25 is longer and/or larger than the lower sheets of the label or than some of them, integrate into the entire multi-layer composite in natural manner. In this regard, the production of such a multi-layer composite is implemented more efficiently and with fewer handling steps than in the case of conventional production methods.

It is true that the projecting section 20 of the uppermost material web 14 or of the cover sheets 25 of the labels 100 is also provided with an adhesive layer 6' on the underside, but it can be pulled off the next lower material web, namely the uppermost material web 11c of the number of material webs 11; 11a, 11b, 11c. This is made possible by a further anti-adhesion layer 22 (e.g. silicone), which is provided exclusively in the third surface area region 3 and there is applied to the top side or outside of the uppermost material web 11c; 12 of the number of material webs 11; 11a, 11b, 11c.

When the label is pulled off, the lowermost sheet 16a (of the corresponding number of lowermost sheets 16 which do belong to the label) in the first surface area region 1 comes loose from the anti-adhesion layer 21 that is applied to the carrier web 10, and the laterally projecting section 20 of the outermost label sheet 24 comes loose from the further anti-adhesion layer 22 disposed on the uppermost material web 11c; 12 of the number of material webs 11; 11a, 11b, 11c. The projecting section 20, which is disposed elevated relative to the bottom of the label by means of one or more plastic films that lie lower, can particularly be a closure region of the multi-ply label; it is dimensioned to be sufficiently long or sufficiently large so that it can be adhesively attached to the surface of the object to be labeled.

In FIG. 2, the layer thicknesses are represented in exaggeratedly large manner and, in particular, are not necessarily to scale. The lateral dimensions in the xz plane shown are also not to scale and are merely given as examples. In reality, the lateral dimensions of the respective label 100 in the respective surface area regions 1, 2 and (with regard to the uppermost film) 3 are therefore selected in suitable manner so that the label 100 and, in particular, the projecting section 20 of its uppermost film 24; 25 fulfills its function, for example its closure function. The label according to FIG. 2 and also according to all the other figures of this application can optionally be configured as a label for closure directly on the object surface of the object to be labeled; alternatively, however, it can also be configured as an all-around label for being wrapped more than once around an object, for example a cylindrical object and, in particular, a container. In this case, a further anti-adhesion layer 23 (e.g. silicone) can also be disposed on an opposite edge of the uppermost film 24; 25 (shown with a broken line in FIG. 2, in the region of the first surface area region, for example). Because of the lengthened, laterally projecting section 20 of the cover sheet 25, the latter can therefore come to lie on itself, so that when the adhesive-coated underside of the projecting section 20 is adhesively attached to the anti-adhesion layer 23, the label 100 is closed.

In the proposed method, a sequence of method steps is provided, which makes it possible to combine the required work steps for imprinting, adhesive connection, punching, positioning and/or handling of the individual sheets of the labels with one another in efficient manner. In this method, the required sheets of the label are produced on a carrier web, for which purpose multiple material webs, for example plastic films, are laid onto or pressed onto the carrier web, one after the other, imprinted, in each instance, and sometimes punched. Imprinting can furthermore comprise imprinting of adhesive layers, adhesive neutralization layers and/or anti-adhesion layers (such as silicone, for example), in addition to imprinting the actual information, such as text components, bar codes, QR codes, other coding, graphic symbols or other information or images. In this regard, the layers last named (i.e. adhesive layers, adhesive neutralization layers and/or anti-adhesion layers), which do not contribute to the actual information content of the label (writing components, etc.), but rather are of importance for the function and/or the structure of the label, are applied to the carrier web and/or to the sheets or material webs that have already been applied on top of it, in such a manner that a multi-layer composite is formed, which forms a plurality of multi-sheet labels, each having a laterally projecting cover sheet or uppermost sheet. In this regard, the multi-layer composite is furthermore produced in such a manner that neither restrictions for the printing process or the quality of the imprinting nor impairments of easy dispensability of the labels occur due to the excess length of the uppermost sheet of the labels. The proposed method yields a multi-layer composite having a plurality of labels, the uppermost sheet of which particularly is or can be imprinted over its full area and with non-reduced printing quality. At the same time, the method makes do with comparatively few method steps. The method is particularly intended for the production of labels that have a number of sheets that is not overly large, for example two, three, four, five or six sheets. In this regard, the sheets are preferably films, particularly plastic films, but they can also be formed from paper or another material. These sheets are not made available in a form that has first been punched individually, but rather material webs having a sufficient size are used so that a sufficiently great number of labels can be accommodated next to one another and/or one behind the other. The carrier web, which can also be a film or plastic film, is also dimensioned accordingly.

In the processing of the carrier web and the material webs, the work steps for punching, imprinting, and adhesive connection of the material webs and the carrier web continue to be linked with one another in such a manner that handling steps are eliminated to the greatest possible extent; all the plies or sheets of the labels are processed in place or above the carrier web, i.e. directly in the multi-layer composite from which the multi-sheet labels are formed. The embodiments described below make it possible to carry out all the method steps in place on the material web, i.e. on the multi-layer composite formed on it, which continues to grow during the course of the method until finally, the finished multi-layer composite with the finished multi-sheet labels is present.

The multi-layer composite 90 shown in FIG. 2 can optionally comprise only a single label 100 or a plurality of labels 100; it can also be fabricated as sheet goods or rolled goods. It can furthermore be present as a multi-layer composite that has already been freed of the waste matrix 5, as shown in FIG. 3. Then, as compared with FIG. 2, the waste matrix 5 formed in the frame region 4 from the layers 11a to 14 that are adhesively connected with one another, is missing, and on the carrier layer or carrier web 10, only the label or the plurality of labels remain(s); in each instance, with a structure formed in the respective third surface area region 3, below the laterally projecting section 20 of the outermost label sheet 24. This structure, situated underneath, represents an elevated carrier structure, i.e. an elevated carrier region 40, which is formed from at least one material web 11a disposed above the carrier web 10. Toward the label, the elevated carrier region 40, which represents a kind of auxiliary liner structure, is separated by means of the punch line or punch surface 60. At its upper end, the elevated carrier region possesses the anti-adhesion layer 22, which supports the section 20 of the cover sheet 25 of the label, which section projects in accordance with the excess length L and carries it in an elevated position as compared with the material web 10. The carrier region 40 possesses a height H that corresponds to the number of material webs 11; 11a, 11b, 11c, in other words results from the layer thicknesses of this number of material webs 11 (if applicable plus the thickness of adhesive layers 6 as well as the top-side anti-adhesion layer 22). The elevated carrier region 40 remains on the carrier web or carrier film 10 when the label 100 is pulled off.

In FIGS. 2 and 3, the proportions of the label and of the carrier region 40 are not to scale; in particular, the carrier region 40 and the label 100 are significantly longer in the direction x than can be shown in the detail representation of FIGS. 2 and 3, for space reasons. The elevated carrier region 40 will therefore possess a height, even if it is formed from a plurality of material web pieces 11a, 11b, 11c that lie one on top of the other, which height is clearly less than the width and/or the length of the carrier region 40 along the directions y (perpendicular to the plane of the drawing) and x. In practice, the elevated carrier region 40, if it does not comprise only a single material web, will be composed of two, three, four or five pieces of material webs 11 adhesively connected one on top of the other, particularly plastic films, i.e. will have multiple layers. The carrier structure 40 therefore forms a film block or, in any case, a layer block or layer stack, which is elevated relative to the carrier film 10, i.e. projects upward beyond it.

The material webs 11; 11a, 11b, 11c; 14 or the sheets 16; 24 of the label are connected with one another by means of the adhesive layers 6 in the first surface area region 1, whereas in the second surface area region 2 the sheets of the label lie only loosely one on top of the other. The sheets of the label 100 are provided with an imprinting 29, as indicated in FIGS. 2 and 3. This imprinting 29 comprises the actual information content of the label or of the respective sheet of the label, in other words, in particular, text components, bar codes, QR codes or other coding or identification, manufacturer information, etc., as well as graphic or other pictorial information and/or surface designs. The text components can particularly comprise user information, for example operating instructions or recommendations for use of the labeled object or container contents; in the sector of pharmacy, for example, information concerning the method of administration to a patient. Although the imprinting 29 in FIGS. 2 and 3 is merely shown at some locations, it can particularly also be structured to cover the whole area or predominantly the whole area. The imprinting 29 can particularly also comprise an imprinting intended for the reverse side as well as a white surface for optical separation from top-side "reverse side imprinting" and actual front side imprinting of the respective sheet. The material webs of the composite are preferably plastic films 19, particularly transparent and preferably colorless plastic films. This makes it possible that both the imprinting to be read from the reverse side and the imprinting to be imprinted on the front side are both printed jointly (with a color-surface imprinting or white-surface imprinting that lies in between) on the front side of the respective sheet. This saves imprinting the undersides of the material webs. First, the imprinting intended to be read from the reverse side is printed on the front side of the transparent film, using reverse printing, i.e. as a mirror image, from above. Afterward, the top side of this plastic film is over-printed over this imprinting, at least in the region of the label sheet, over a large area or over the entire area (over the entire area, if applicable except for possible smaller regions that are left out, which can serve as viewing windows) with a white or other, particularly light-colored or, in any case, opaque, non-transparent background ink. Then, in turn, the imprinting to be read on the front side is imprinted onto this background ink. In this manner, all the text components and other information of the label, even if they/it are intended to be read from the reverse of the respective label sheet, can be printed onto the front side of the respective label sheet from above.

Application of adhesive layers, adhesive neutralization layers and/or anti-adhesion layers can also take place using printing technology. Imprinting of the carrier web and the films that lie on top of it with the anti-adhesion layers 21, 22, 23, which are provided individually, as well as with adhesive layers 6, 6' can therefore take place directly before and/or after imprinting of the text components onto the top side of the respective plastic film or material web.

In the claims of this application, imprinting of the textual information is not explicitly mentioned, since a label, particularly one having a plurality of sheets, is, of course, provided with informational content at least in text, in accordance with its intended use. In contrast, the manner in which adhesive connection of the material webs and/or avoidance of an adhesive connection is/are achieved in terms of printing technology is stated in more concrete terms, at least in some dependent claims. In this regard, FIGS. 2 and 3 are based on an exemplary embodiment in which not adhesively coated plastic films 19, i.e. films that are not provided with adhesive layers at the beginning of their use (and are preferably transparent) are used as material webs and as a carrier web 10 for the multi-layer composite 90 or film composite. The material webs or plastic films 19 that have been laid one on top of the other therefore lie only loosely one on top of the other, as in the second surface area region 2. In those places where they are supposed to be adhesively connected with one another, corresponding adhesive layers 6, 6' are to be imprinted; in each case, from above onto the lower one of the two films, in each instance. In those places where the adhesive connection is only supposed to be temporary, the respective anti-adhesion layers 21, 22, 23, particularly in the form of silicone, are imprinted, specifically before imprinting of the adhesive layer. The multi-layer composite 90 shown in FIG. 2 is produced in that a further material web, i.e. preferably a further plastic film 19, is pressed onto the carrier web 10 imprinted with the anti-adhesion layer and the adhesive layer, in each instance, and this web is then individually imprinted (comprising imprinting of text information, of a further adhesive layer and, if applicable, of an anti-adhesion layer situated underneath), before the next-higher film is applied and in turn imprinted. Before application of the uppermost material web 14 or the uppermost plastic film 19', a punch line 60 through the films 19 stacked up to that point (with the exception of the carrier film 10) is produced. After application of the last film 19', either before or after it has been imprinted, the frame punch line 70 is produced, thereby not only forming the excess length L of the laterally projecting section 20 of the cover sheet 25 of the label, but also, at the same time, the remaining side edges of all the sheets of the label are produced flush with one another, i.e. aligned with one another. For example, all four edges of the cover sheet 25 and at least three edges of all the other label sheets 16, which lie farther down, can be punched by means of the frame punch line 70. Depending on the embodiment, two or even fewer edges of the label sheets that lie farther down can be punched, particularly if an excess length of the cover sheet is also supposed to exist at a further edge. Application or pressing on of the respective material webs takes place, in each instance, by means of rolling them on, laminating them on, overlaying them on or in some other way.

Thanks to the production method, in which the individual webs or films of the multi-layer composite are placed one on top of the other and then imprinted in suitable manner (and for application of the next web or film, in each instance), in combination with the punch lines of method steps c) and d), production of the multi-layer composite 90 shown in the figures of this application is made possible, which composite contains one or more multi-sheet labels 100, each having an over-long, laterally projecting cover sheet 25. Successive buildup of the multi-layer composite, particularly film composite, can take place by means of the sequence in which the respective method steps are linked with one another, without having to temporarily remove individual films or some films for individual processing (for example in order to obtain an individual surface layout). During the entire production process, the films that have already been applied can remain on or above the carrier film or carrier web 10. The use of transparent films furthermore makes it possible to carry out all the printing processed from the top side, i.e with the printing direction from above downward or in the direction of the carrier web or carrier film. Furthermore, the carrier web and the multi-layer composite that is formed on it can remain in the printing machine or printing system during the entire production process, without it or individual material webs having to be removed temporarily (for example in order to undertake punching, printing or other processing steps on them). In particular, no separate machine pass for dispensing and/or punching of individual material webs or films is required; conventionally required dispensing procedures for handling of individual films are eliminated.

Furthermore, in the case of the production method presented, an elevated carrier structure 40 is formed below the excess length of the label cover sheet, which structure keeps the laterally projecting section 20 of the cover sheet 25 at the same height as the remaining surface area region of the cover sheet 25. In this way, the projecting section 20 of the cover sheet can be imprinted with the same printing quality as the remaining part of the cover sheet, particularly with an identical contact force, with an identical distance from the printing die and/or at an identical height above the carrier film 10. In this way, possible smearing of the print image in the region of the laterally projecting section 20, i.e. in the region of the excess length of the cover sheet, is prevented. The elevated carrier structure 40 therefore forms a height equalization element below the excess length of the cover sheet, thereby ultimately improving and/or ensuring the quality of the imprint on the cover sheet. A smeared or otherwise defective print image is prevented, for example in the region of the label closure.

The present method therefore makes the production of multi-sheet labels possible, which differ in thickness or height in different surface area regions. The method furthermore makes the production of a multi-layer composite possible, in which one or more such labels are integrated. Furthermore, the method is less labor-intensive and therefore more cost-advantageous than conventional production methods. Possible deterioration of the print image on the cover sheet of the labels, which could arise as the result of the different label thickness in different surface area regions, is also prevented by this method.

Furthermore, non-transparent films and also paper webs can also be used in place of transparent plastic films for the production of the multi-layer composite. Suitable printing processes for imprinting the respective material web or label sheets are, for example, flexographic printing, digital printing or offset printing, particularly flat-bed screen printing. These printing techniques can be used not only for textual and other information, but also for printing the other printable layers, i.e. not only for adhesive layers and adhesive neutralization layers but also for anti-adhesion layers.

Layers, particularly adhesive layers, for example, can alternatively also be applied using the hot-melt method. In this regard, a hot-melt material or hot-melt adhesive material is used. The hot-melt adhesive or the hot-melt material is applied as a layer or coating, for example in those surface area regions in which an adhesive composition or other composition is desired. To apply the hot-melt material, it is heated to a sufficiently high temperature in a hot-melt system or adhesive coating system, thereby becoming moldable. The heated hot-melt material is then pressed on as a hot layer and cools upon contact with the material ply, film or other layer that is situated underneath and/or on top. The adhesive coating system can furthermore be integrated into a printing system.

All of the individual characteristics discussed up to this point can also be transferred to the following exemplary embodiments.

FIG. 4 shows an alternative exemplary embodiment with regard to the method of adhesively connecting the different material plies or films with one another using printing technology. According to FIG. 4, in contrast to FIGS. 2 and 3, no material webs 11, 14 that are not coated with adhesive, i.e. are free of adhesive are used, but rather those that are coated with adhesive on one side, in each instance, i.e. covered with an adhesive layer 6. During the method for the production of the multi-layer composite 90, these material webs 11; 14 or these plastic films 19 are laid down onto or over the carrier web 10 with their adhesive layer 6 downward. For the carrier web itself, a carrier web that is not coated with adhesive, particularly a plastic film that is not coated with adhesive is preferably used. Then, the layer stack required for the multi-layer composite is produced, in that the material webs 11, 14, which are now coated with adhesive on the underside, are each laid down or pressed down individually and afterward imprinted, until finally, the entire multi-layer composite has been completed in accordance with the claimed production method. In contrast to the exemplary embodiment of FIGS. 2 and 3, the following changes occur:

Since the material webs used are already coated with adhesive on the underside or one side, no adhesive needs to be imprinted onto them any longer. Instead, in such surface area regions in which adhesive connection of films that lie one on top of the other is not desired, an adhesive neutralization layer 7 ([in English:] glue killer), in each instance, is applied to the film that has already been laid down. Imprinting of the adhesive neutralization layer can be carried out before or after imprinting of any anti-adhesion layers 21, 22 (here in the surface area regions 1 and 4 of the carrier web 10 and in the surface area region 3 of the uppermost material web). After the adhesive neutralization layer 7 (in the second surface area region 2) and a possible anti-adhesion layer have been imprinted on the respective exposed carrier web or material web, the next higher material web is laid down or pressed down. Since its adhesive-coated side, i.e. its adhesive layer 6 faces downward or, in any case, faces the multi-layer composite that has been produced up to that point, a reaction of the underside adhesive layer 6 of the next higher material web with the adhesive neutralization layer 7 situated underneath it occurs as the result of contact with it, thereby canceling out the adhesive force there. This occurs in the second surface area regions 2, i.e. in the very predominant surface area region of the sheets of the labels, which corresponds to the legible surface area of the covered label sheets. By means of bringing adhesive layer 6 and adhesive neutralization layer 7 in contact with one another, and their reaction with one another, a uniform, no longer adhesive double layer or, if applicable, total layer occurs under some circumstances (in FIG. 4, the boundary between the respective adhesive neutralization layer 7 to the adhesive layer 6 that lies above it is therefore merely shown with a broken line; this boundary will no longer be evident on the real label). In the remaining surface area regions 1, 3, and 4, no adhesive application is required any longer, since with every new, next higher material web, its adhesive layer 6, present on the underside, is supplied to the previous multi-layer composite. In place of imprinting of adhesive layers in necessarily adhesive surface area regions, according to FIG. 4 imprinting of adhesive neutralization layers 7 takes place for the production of non-adhesive surface area regions.

All the exemplary embodiments of this application can optionally be implemented by means of the adhesive connection using printing technology explained using FIG. 4, or by means of the adhesive connection using printing technology explained using FIG. 2, wherein depending on the adhesive connection'technology, either materials webs coated with adhesive on one side or not coated with adhesive, particularly plastic films, are used. Regardless, the representation in the drawings and the description of the exemplary embodiments described below takes place based on the use of films not coated with adhesive, i.e. as in FIG. 2. Films not coated with adhesive are furthermore less expensive than films coated with adhesive, and thereby the costs are further reduced.

FIG. 5 shows a further development in which, after application and imprinting of the material webs 11, the last, outermost material web 14, which is intended as a cover sheet 25, i.e. as the outermost sheet 24 of the labels 10, is not applied immediately on its uppermost material web 11c; 12. Instead, first a second from the outside, further material web 13 is applied, which serves for the production of the second from the outside sheet 28 of the respective label 100. Application of this next to last material web 13 takes place between the steps b) and c) of this method, i.e. directly before carrying out the first punch line 60. Not only the number of lowermost material webs 11, but rather also the further material web 13 is punched by means of the first punch line 60. All the punch lines 60, 70 preferably reach only directly up to the carrier web or end within it or closely above it, so that the carrier web 10 continues to hold a plurality of labels together. Alternatively, however, the carrier web can also be punched through; also exclusively in the case of the second punch line 70 (format punch line); the finished multi-layer composite then contains only one label.

The further material web 13 applied between the steps b) and c), and afterward imprinted, forms the second from the top sheet 28 of the labels. Just like the cover sheet 25, it possesses an excess length L; L1, i.e. a'projecting section 30; 30a, thereby causing the second from the outside sheet 28 to project laterally beyond the lowermost films 11. As FIG. 5 shows, the section 30; 30a is releasably adhesively connected with the anti-adhesion layer 22 of the uppermost material web 11c; 12 of the number of material webs or lies on it. However, the projecting section 30; 30a of the second from the outside sheet 28 is separated from the remainder of the second from the outside sheet 28 by means of a punch line 60; it therefore forms a separate piece of the second from the outside sheet 28. As soon as the fabricated label 100 of the multi-layer composite 90 is dispensed, the projecting section 30; 30a of the second from the outside sheet 28 is separated from the elevated carrier structure 40. When the label 100 that has been dispensed onto an object is opened by the user for the first time, the projecting section 30; 30a of the second from the outside sheet 28 is also separated from the remainder of the label 100.

FIG. 5 therefore shows an exemplary embodiment in which the labels are not provided as all-around labels, but rather have a closure 15 in the third surface area region 3, which is formed from two material webs 13, 14 or two label sheets 28, 24. Accordingly, in FIG. 5, no top-side anti-adhesion layer 23 is provided in the first surface area region 1, as it is optionally provided in FIG. 2 on the outermost label sheet 24 or cover sheet 25.

In FIG. 5, the top side of the second from outside material ply 13 in the third surface area regions 3 is also covered with an anti-adhesion layer 26—at least in certain regions, in order to make sufficiently easy release of the upper closure section 20 from the lower closure section 30 possible. Both material plies 13, 14 are configured to be adhesive on the underside in the third surface area region 3, as can be seen on the basis of the adhesive layers 6' there, above the respective anti-adhesion layer 22; 26. The expanse and area-related distribution of the anti-adhesion layer 26 within the third surface area regions 3 can be freely varied, for example in order to suitably adjust easy movement of the closure 15 or its adhesive force for repeated opening and re-closing. According to FIG. 5, for example, the anti-adhesion layer 26 that lies on top is left out on the innermost and outermost (i.e. here, the left and right) end of the section 30. Likewise, an inner (i.e. here, left) partial region of the third surface area region, for example, could be provided only with the adhesive layer 6', and the remaining, outer (here the right) partial region could be provided with both the anti-adhesion layer 26 and the adhesive layer 6'; after initial gripping of the cover sheet 25 or of its section 20, this section would still be held on the section 30 of the second from the outside label sheet 28 that is situated underneath, with sufficient adhesive force, even after repeated opening and closing; the latter section is laterally offset relative to the number of lowermost label sheets 16. The underside of the section 30—just like the underside of the lowermost label film 11a of or the lowermost label sheet 16a in the first surface area region 1—is configured to be adhesive and therefore adheres to an object, directly to its surface, after the label 100 has been dispensed on it. When the label closure 15 is opened, only the section 20 of the cover sheet 25 is lifted up, whereas the section 30 permanently remains on the surface of the object. For the remainder, the structure of the multi-layer composite or of the label embedded in it, in FIG. 5, is the same as that in FIG. 2.

As has already been mentioned, the cross-sectional views are only schematic, so that in relation to the layer thicknesses, the lateral dimensions along the directions x, y are clearly greater in order to implement planar labels. The cross-sectional views of the figures therefore merely show such sections of the surface area regions 1, 2, 3, and 4 that are situated close to the boundaries between these surface area regions.

FIG. 6 shows a further exemplary embodiment, in which two different projecting sections 20a, 20b of the cover sheet 25 are produced per label 100, in each instance. As in FIG. 2 or 5, a third region 3; 3a exists, which borders on the second surface area region 2 and in which at least the cover sheet 25 has a section 20; 20a that projects laterally beyond the lowermost films 11. This section can particularly be used as a closure 15 or part of such a closure. However, also adjacent to the first surface area region 1, in which the material webs 11 or sheets 16 of the label are adhesively connected with one another, a further third surface area region 3; 3b is also provided according to FIG. 6, in which region the cover sheet 25 also has a laterally projecting section 20; 20b. Accordingly, a punch line 60 or other severing line or cutting line is also provided between the surface area sections 1 and 3b, and at this location of the label, as well, an elevated carrier region 40; 40b is formed, which serves as a substratum for the further projecting section 20b. Below the cover sheet 25 or the outermost label sheet 24, the anti-adhesion layer 22 is also provided in the surface area section 3b. The projecting section 20; 20b that lies on it and is releasably adhesively connected possesses an excess length L; L2 that is selected in suitable manner. It can be used as the lower part of the closure and can have an anti-adhesion layer 23, particularly on its top side, on which the adhesive underside of the opposite section 20; 20a (having the excess length L1) can be adhesively connected in order to close the label once or repeatedly. As compared with FIG. 2, the embodiment according to FIG. 6 has the advantage that a gentler transition between the labeled object surface and the top side of the cover sheet 25 is achieved by means of the section 20b; a gentler height increase of the cover sheet as compared with the surface of the object is achieved by means of the end of the cover sheet that is brought down laterally and has the excess length L2. Therefore the label can be configured with one ply on its dispensing edge (left end of the label in FIG. 6; having the function of a book spine or of a binding) or, in any case, can have only some of its label sheets here.

Furthermore, the end of closure that lies down or is to be laid. down (section 20; 20a having the excess length L1) can thereby be adhesively connected at a slighter distance from the surface of the object and is thereby, under some circumstances, better protected against accidental opening, for example by means of unintentionally touching other objects as it passes them. Even in the case of labels that are not configured as an all-around label, such a projecting section 20b can be provided, disposed in the surface area region 3b adjacent to the first surface area region 1. It then does not form a component of the closure, but rather only ensures a gentler height increase on the label edge that possesses the function of the book spine or stapling of the multi-sheet label. Depending on the embodiment, an adjacent section 3; 3b also only needs to be provided on the side of the first surface area region, so that per label, only a single projecting section 20 (namely 20b) is provided.

In the case of all the other embodiments, in place of the three lowermost label sheets 16a, 16b, 16c shown, having a smaller label surface area (according to the punch line or punch lines 60), likewise also only one, two, four or five or another number of such label sheets or material webs 11 intended for this purpose can be provided. The number of these lowermost films 16 or material webs 11; 12 is fundamentally not restricted upward; at most, ease of handling and, in particular, the rigidity Of a multi-sheet label might make it appear advisable not to select this number to be too large, for example not greater than five (corresponding to a label having six sheets). Fundamentally, however, labels having even more sheets can be produced without having to give up the advantage of the particularly efficient method sequence. The printed image on the cover sheet 25 can also be imprinted even in the case of thicker labels, fundamentally without any loss in quality, since the carrier structure 40; 40a; 40b also comprises a correspondingly greater number of material webs or films in the case of a greater number of label sheets that lie on the inside. The elevated carrier structure 40 leads to a horizontal surface, i.e. outer surface of the outermost label sheet 24; particularly at the transition to the laterally projecting section 20; 20a; 20b, i.e. at the transition above the punched edge(s) 60 of the lowermost label sheets 11 that lie farther on the inside. After application and imprinting of the outermost material web, the waste matrix 15 can furthermore be pulled off the frame region 4 of the carrier web 10 in the case of all the exemplary embodiments of the method, wherein the labels 100 remain adhering to the carrier web 10 and the elevated carrier regions 40; 40a, 40b continue to be permanently connected with the carrier web 10, i.e. adhesively connected with it.

FIGS. 7 and 8 show two alternative embodiments of a multi-layer composite 90 having an alternative structure with regard to the surface area allocation of the at least one label 100. The multi-layer composite optionally comprises, in each instance, either only a single label (for example according to FIG. 8) or a plurality of labels 100. According to FIG. 7, the third surface area region 3 is configured in L shape. It runs along two edges of the basic label surface area 9. The layer structure in the respective surface area regions 1, 2, 3, and 4 is the same, in each instance, as in one of the exemplary embodiments of FIGS. 2 to 6. At the boundary between the surface area regions 1 and 2, the adhesive connection between sheets of the label 100 that lie one on top of the other ends or begins. The punch line 60 cuts through all the lower sheets 11; 11a, 11b, 11c, and the punch line 60 additionally also cuts through the outermost sheet 24 (cover sheet 25). According to FIG. 8, the third surface area region 3 is configured in U shape and runs along three edges of the basic label surface area 9. While in FIGS. 1 to 6, the first punch line 60 or the first punch lines 60 run in a direction y, namely transverse to the transport direction t or to the first lateral direction x, the first punch lines 60 in FIGS. 7 and 8 run in L shape or U shape around the lowermost, smaller label sheets 11. The laterally projecting section of the outermost sheet 24 (if applicable, also of the second from the outside sheet) can, however, also run around all four edges of the lower sheets 11.

FIGS. 9A to 9J show an exemplary sequence of the method steps that have already been explained, as they were already explained individually, in detail, above. The multi-layer composite according to FIG. 2 is produced by means of the sequence of the method steps.

The carrier web 10 is imprinted according to FIG. 9A. According to FIGS. 9B and 9C, a first material web 11a is applied and imprinted; according to FIG. 9D, a second material web lib is applied and imprinted; and according to FIG. 9E, a third material web 11c is applied. Therefore a number of three material webs is present here, the uppermost one 11c of which is also subsequently imprinted (FIGS. 9E to 9H), specifically partly before (FIGS. 9E and 9F) and partly after (FIG. 9H) formation of the first punch line 60 (FIG. 9G). According to FIG. 9E, the actual imprinting 29, which contains textual or other content information, is printed on the label sheet 11c; 12 in the second surface area region 2, and according to FIG. 9F, the anti-adhesion layer 22 is imprinted in the third surface area region 3. According to FIG. 9G, the punch line 60 is made between these two surface area regions 2, 3, and only afterward is the adhesive layer 6' printed onto the first, third, and fourth surface area region of the material web 11c. According to FIG. 9I, finally, the outermost material web 14, which serves as the cover sheet 25, is applied and imprinted, before, according to FIG. 9J, the outer edges of the label sheets are punched by means of the format punch line 70, in all the material webs 11; 11a, 11b, 11c; 14, if they have not already been punched by means of the punch line 60.

REFERENCE SYMBOL LIST 1 first surface area region
2 second surface area region
3; 3a; 3b third surface area region
4 frame region
5 waste matrix
6; 6' adhesive layer
7 adhesive neutralization layer
9 basic label surface area
10 carrier web
11; 11a; 11b; 11c material web
12 last material web
13 further material web
14 outermost material web
15 label closure
16; 16a; 16b; 16c; 16' sheet
19; 19' plastic film
20; 20a; 20b section
21; 22; 23; 26 anti-adhesion layer
24 outermost sheet
25 cover sheet
28 second from the outside sheet
29 imprinting
30; 30a; 30b section
40; 40a; 40b elevated carrier region
60; 70 punch hole
90 multi-layer composite
100 label
L; L1; L2 excess length
t transport direction
x; y lateral direction
z third direction

The invention claimed is:

1. A method for producing labels, wherein each label has a plurality of sheets adhesively connected with one another in respective first surface area regions of respective basic label surface areas of the labels and lie on one another in respective second surface area regions of the respective basic label surface areas, wherein the method comprises the following:

step a) imprinting of a carrier web, comprising printing an anti-adhesion layer onto the carrier web in a frame region provided for a waste matrix, wherein the frame region surrounds the basic label surface areas, and in the first surface area regions of the basic label surface areas, step b) application of a number of material webs to the carrier web and/or one on top of another, as well as imprinting this number of material webs,
wherein the number of material webs serves for production of a number of lowermost sheets of each label and comprises either a single material web or a plurality of material webs,
wherein each material web of the number of material webs is first applied individually and then imprinted, and
wherein an anti-adhesion layer is imprinted onto a last material web of the number of material webs in third surface area regions, which are disposed between the first surface area regions and the frame region and/or between the second surface area regions and the frame region, step c) implementation of a punch or other severing of a material web of this number of material webs between the third surface area regions and the first and/or second surface area regions, and step d) completion of each label by application and imprinting an outermost material web intended as an outermost sheet of the labels, and by carrying out a frame punch or other severing of all the material webs,
wherein in step d), the frame punch is carried out in such a manner that a waste matrix can be severed and/or is severed from the first, second and/or third surface area regions, and that a laterally projecting section of the outermost sheet of the respective label is formed in the third surface area regions, in each instance, wherein the laterally projecting section projects laterally beyond the number of lowermost sheets of the respective label.

2. The method according to claim 1, wherein when using the number of material webs, elevated carrier regions, which are permanently adhesively attached to the carrier web, and which project upward beyond the carrier web toward the laterally projecting section of the outermost sheet of the respective label, are formed in the third surface area regions.

3. The method according to claim 2, wherein the outermost sheet of each label lies on a respective elevated carrier region of the elevated carrier region and/or is releasably adhesively attached, in a region of an excess length of the outermost sheet.

4. The method according to claim 1, wherein a further material web is applied and imprinted between step b) and step c), which web serves as a second from an outside sheet of the respective label, wherein a laterally offset section of the second from the outside sheet of each label is formed by the punch of the step c) and the frame punch of the step d), wherein the laterally offset section is laterally offset relative to the lowermost sheets of the respective label.

5. The method according to claim 4, wherein the further material web and/or an uppermost material web is imprinted in such a manner that the laterally projecting section, in each instance, of the outermost sheet lies on and/or is releasably adhesively connected to the section of the second from the outside sheet, wherein an anti-adhesion layer is printed on the further material web in the third surface area regions.

6. The method according to claim 4, wherein the respective label has a label closure that comprises the laterally projecting section of the outermost label sheet or the laterally projecting section of the outermost label sheet as well as the laterally offset section of the second from the outside label sheet.

7. The method according to claim 1, wherein the labels are produced as more-than-once-wraparound labels, wherein the imprinting of the outermost material web in step d) comprises imprinting of an anti-adhesion layer onto the outermost material web in the first surface area region or in a further third surface area region.

8. The method according to claim 1, wherein each third surface area region comprises a surface area region that borders on one side of the first surface area region.

9. The method according to claim 1, wherein each material web is a plastic sheet.

10. The method according to claim 1, wherein each material web is a plastic film not coated with adhesive, which are free of adhesive coatings on both sides, and wherein imprinting of the carrier web (10) and/or of each material web furthermore comprises imprinting of a respective adhesive layer in the frame region, in the first surface area regions, and in the third surface area regions, wherein any anti-adhesion layers are covered by the respective adhesive layer.

11. The method according to claim 1, wherein the carrier web is a carrier web not coated with adhesive, whereas material webs coated with an adhesive layer on one side are used as material webs, wherein the material webs are applied to an exposed side of the carrier web or to a preceding material web with their coated, adhesive side.

12. The method according to claim 11, wherein imprinting of the carrier web and/or of each material web furthermore comprises imprinting of a respective adhesive neutralization layer in the second surface area regions, before a coated side of a subsequent material web is applied.

13. The method according to claim 1, wherein step a), step b), step c) and step d) are carried out in a printing machine, wherein the carrier web is used in the printing machine as a support for each material web, until the labels have been finished, and wherein each material web is sequentially applied above the carrier web and imprinted in this position.

* * * * *